United States Patent [19]
Holly et al.

[11] 3,930,734
[45] Jan. 6, 1976

[54] PROCESS AND APPARATUS FOR SENSING MAGNITUDE AND DIRECTION OF LATERAL DISPLACEMENT

[75] Inventors: Sandor Holly, Falls Church; Shui Lin Chao, Alexandria, both of Va.

[73] Assignee: Atlantic Research Corporation, Alexandria, Va.

[22] Filed: Apr. 26, 1974

[21] Appl. No.: 464,597

[52] U.S. Cl. .................................. 356/111; 356/28
[51] Int. Cl.[2] .......................................... G01B 9/02
[58] Field of Search............ 356/28, 106 R, 27, 111, 356/169

[56] References Cited
UNITED STATES PATENTS

| | | | |
|---|---|---|---|
| 3,502,414 | 3/1970 | Kreckel et al. ...................... | 356/169 |
| 3,779,647 | 12/1973 | Dawson ............................. | 356/109 |

OTHER PUBLICATIONS

Mazumder "Laser Doppler - - - Using Frequency Shifted Incident Beams"; 16 *Applied Physics Letters* 462, June 1970.

*Primary Examiner*—John K. Corbin
*Assistant Examiner*—Conrad J. Clark
*Attorney, Agent, or Firm*—Martha L. Ross

[57] ABSTRACT

Process and apparatus therefor for sensing the magnitude and direction of lateral displacement of at least one line or slit element of an article which comprises producing two coherent light beams of the same intensity, one of the beams having a different frequency from that of the other beam, the frequency difference $\Delta f$ being within the radio frequency range; converging the two beams to form an interference zone comprising, within the zone of convergence, a fringe pattern characterized by continuous lateral movement at a rate equal to $\Delta f$; adjusting the fringe period of the pattern to a width which is substantially wider than the element or the positive difference between the width of the element and an integer multiple of the fringe period; positioning at least the portion of the article bearing the element within the interference zone in such manner that the article lies in a plane defined by the $x$ and $y$ axes of the fringe pattern and the element is in a position, relative to the article, such that its longitudinal axis is substantially parallel to a fringe plane; laterally shifting the fringe zone and/or the article along the $y$-axis to produce relative lateral displacement between them while maintaining the element in substantially parallel fringe-plane alignment at least within the central portion of the fringe zone; continuously determining the phase of the RF signal component of the radiation scattered or transmitted by the element as the relative lateral displacement between the zone and article continues from a first to a second position of the element within the fringe zone; simultaneously and continuously comparing the phase of the scattered or transmitted radiation RF signal with the phase of a constant reference RF of $\Delta f$ frequency; and sensing the magnitude and direction of phase shift between the RF signal component of the scattered or transmitted radiation and the RF reference between the first and second positions, whereby the magnitude indicates the extent of lateral displacement of the element between the two positions and the direction indicates the direction of relative lateral displacement. The element can comprise a single element, two essentially parallel elements, or a plurality of elements wherein at least each two adjacent elements are substantially parallel. The process and apparatus are particularly useful for accurate measurement of fractional distances between two elements with a high degree of fine resolution; the total magnitude and direction of displacement of elements of a measuring device, such as an encoder; and the distance from a reference element to a desired position on the article.

70 Claims, 10 Drawing Figures

PROCESS AND APPARATUS FOR SENSING MAGNITUDE AND DIRECTION OF LATERAL DISPLACEMENT

BACKGROUND

There has been a long-felt need for a non-contact system for accurately measuring a fractional distance between two substantially parallel line or slit elements; the total magnitude and direction of displacement of a reticled measuring device, such as an encoder, including fractional resolution of a final position between two adjacent lines of a reticle; the distance from a reference element to a desired position on an article as, for example, for an operation, such as a spot weld, in a production process; and the like, wherein the system is relatively simple and provides a greater degree of fine resolution and smaller margin of error than is generally available in the present state of the art.

Various means have been employed to provide increasingly fine distance resolution. These include, for example, maximizing reticle density on a linear encoder or on the outer periphery of a disc encoder. This has limitations imposed by such factors as the maximum practical diameter of the disc, maximum practical line density possible in the manufacturing process, and exponentially-increasing cost with increasing disc size and reticle density. Optical and electronic systems have been devised for resolution of fractional distances between two adjacent reticle elements. These generally require the use of at least two separate optical systems with associated electronics, such as at least two slit detector arrays, which require even higher element densities than the article, which must be delicately positioned spatially (with associated error) and which, generally, can at best resolve only equally-sized increments, thereby limiting fineness of resolution. With such prior art fraction resolution systems, it is very difficult to determine accurately multiple element displacement.

The present invention, by use of a single laser interferometer system, can measure lateral displacement from a single element, any fractional distance between two elements, and total displacement from one position to another, including multiple adjacent element integers plus any fractional distance from the last determined element, in a single operation, which also includes a determination of the direction of lateral displacement or distance and the accurate determination of smaller distances than has hitherto been possible.

Laser Doppler Velocimeters (LDV) have recently been developed for determining the rate of fluid flow in wind and water tunnels by suspending small particles in the fluid and determining their velocity and size by means of the velocimeter. Such velocimeters generally comprise convergent laser beams of equal size, intensity, and frequency which produce a stationary interference fringe pattern within the zone of convergence, sometimes called the probe volume. The interference fringes are planes which are normal to the plane defined by the center lines of the two converging laser beams and parallel to the bisector of the converging beams. In operation, the apparatus is set up so that the fluid-borne particles move across the fringes in trajectories normal to the fringe planes, the radiation scattered by the moving particles is optically collected, separated electronically into AC and DC signal components, and the AC/DC ratio is used as a means of determining the size of the particles. Such Laser Doppler Velocimeters are described in detail in the article by W. M. Farmer, "Measurement of Particle Size, Number Density, and Velocity Using a Laser Interferometer," *Applied Optics*, Vol. 11, No. 11, Nov. 1972, pp. 2603–2612, and G. J. Rudd, U.S. Pat. No. 3,680,961.

In more recent development of the Laser Doppler Velocimeter, the art discloses the use of probe volumes in which the fringes are caused to move continuously in a direction normal to the fringe planes by employing converging laser beams of the same intensity but slightly different frequency, the frequency difference $\Delta f$ being within the radio frequency band. Such shifting of the frequency of one of the beams can, for example, be produced by diffraction of an incident laser beam by means of an ultrasonic Bragg cell, which can be made to divide the incident beam into two diverging beam components of the same intensity, one nondiffracted component having the incident beam frequency and the other diffracted component with its frequency shifted by an amount equal to the Bragg cell frequency. Since the two coherent light beams which leave the Bragg cell are diverging, it is required that the beams be converged by an appropriate optical system to form the desired interference fringe pattern. The moving fringe pattern moves at a rate equal to $\Delta f$ which in turn is equal to the Bragg cell frequency. As in the case of stationary fringes, the AC/DC ratio technique is employed to determine particle sizes. The application of single and two-dimensional Bragg cell systems to the LDV is disclosed in Chu et al., "Bragg Diffraction of Light by Two Orthogonal Ultrasonic Waves in Water," Appl. Phys. Lett., Vol. 22, No. 11, June 1, 1973, pp. 557–59; and W. M. Farmer et al., "Two-Component, Self-Aligning Laser Vector Velocimeter", *Applied Optics*, Vol. 12, No. 11, Nov. 1973, pp. 2636–2640.

None of the available art recognizes or discloses the present invention, its principle of operation, or its use in sensing the magnitude and direction of lateral displacement of or lateral distance from a line or slit element of an article. The present invention utilizes known fringe spacings (which can be calculated or otherwise determined by conventional art techniques), a fringe pattern moving at a rate determined by the $\Delta f$ radio frequency, relative lateral shifting of the zone and element, and continuous comparison of the RF (AC) component of scattered or transmitted radiation produced by the at least one element with a $\Delta f$ RF reference to determine the magnitude and direction of phase shift between the RF radiation signal and the RF reference from one position of the element to another within the fringe zone.

Because the measurement does not require absolute measurement of laser light intensity, but only the detection of the RF component of scattered or transmitted radiation and its phase shift comparison with a constant RF reference, the process and apparatus of the invention have additional advantages including but not limited to the following. Accuracy of measurement is largely independent of intensity fluctuations of the laser source. Accuracy is not affected or compromised by the reflectivity or refractivity of the line elements. Accuracy does not depend on the calibration accuracy of the signal detector devices or the distortions or nonlinearities of components of the optical system, either per se or in terms of sensitivity to changing environmental conditions. Thus, the system and components can be relatively low-cost and can be used in uncontrolled environments, such as manufacturing facilities. In the case of structures with periodically spaced elements, such as linear or angular encoder plates, slight errors in periodicity of the elements are averaged out because a relatively large number of adjacent elements can be simultaneously sensed in the fringe zone at any given time.

It will be understood that the terms "line" and "slit," as used in this specification and claims, include both continuous and discontinuous straight lines or slits. In the latter case, it is essential only that the centers of discontinuous components making up the line or slit be arranged along the same longitudinal axis and the fringe period be substantially wider than the widest component, or the positive difference between the width of the component and a whole integer multiple of the fringe period. Within these limitations, the components can be of any desired shape and size, e.g., rectangular, triangular, trapezoidal, round, oval, and the like.

SUMMARY OF THE INVENTION

The invention comprises a process (and apparatus therefor) for sensing the magnitude and direction of lateral displacement of at least one line or slit element of an article by providing a laser source; dividing the coherent laser beam into two coherent beams of equal size and intensity which differ in frequency, the difference $\Delta f$ being within the radio frequency band; converging the two beams to form, within the volume of convergence, an interference fringe pattern zone in which the fringe pattern moves laterally at a rate equal to $\Delta f$; positioning at least the portion of the article bearing the element within the fringe zone in such manner that the article lies in a plane defined by the axis normal to the plane of the convergent beams ($x$-axis) and the axis normal to the fringe planes ($y$-axis) and the element is in a position, relative to the article, such that its longitudinal axis is substantially parallel to a fringe plane, i.e., parallel to the $x$-axis, and laterally shifting the fringe zone and/or the article along the $y$-axis to produce relative lateral displacement between them while maintaining the element in substantially parallel fringe-plane alignment at least within the central portion of the fringe. In the course of such relative lateral displacement, the RF signal component of the radiation scattered or transmitted by the element, the frequency of which is the $\Delta f$ rate of the moving fringe pattern, modified by the relative rate of displacement between the fringe zone and the elements, is continuously determined by suitable conventional equipment as the element shifts laterally within the zone and its phase coninuously compared with the phase of a constant RF reference of $\Delta f$ frequency. By means of conventional electronic equipment, the magnitude and direction of phase shift between the scattered or transmitted radiation RF signal and the constant RF reference can be determined between initial, succeeding, and final positions. The magnitude of phase shift indicates the extent of lateral displacement of the element and, thereby, the distance between a first element position on the article and a desired final position on the article.

It will be seen, therefore, that since the displacement or distance resolution (including a fractional distance between two elements, e.g., two adjacent elements of a scale reticle) is a function of phase shift continuously and simultaneously compared between the phase of the RF radiation signal and the phase of the RF reference, the degree of resolution is very high and is limited mainly by the sophistication of the particular optics and electronics components employed in the particular apparatus. The direction of phase shift indicates the direction of relative lateral displacement and is determined simultaneously with determination of the magnitude of displacement.

The width of the fringe spacing (fringe period) $\lambda_s$ should be substantially wider than the element or, in the case of an element which is wider than at least one fringe period, the difference between the width of the element and a whole integer multiple of the fringe period. The fringe period is a known quantity since it can be determined by conventional techniques from such factors as laser wavelength and angle of convergence of the beams. Adjustment of the system to provide a given fringe period can be accomplished in various ways as, for example, by changing the input laser wavelength. Generally, it is most easily achieved by adjusting the convergent angle of the beams by such conventional means as shifting the converging optics along the $z$-axis or by changing the RF frequency of the $\Delta f$-producing means, such as a Bragg cell.

A substantial difference in width between the fringe period and the element, as aforedescribed, is essential to obtain an adequate RF signal from the radiation scattered or transmitted by the element and, thereby, an adequate phase signal for phase comparison. An element width substantially equal to the fringe period (or a whole integer multiple of the fringe period) produces a RF signal equal to zero or a minimum approaching zero so that it cannot be sensed by the method of the invention. The element is preferably substantially parallel to the fringe plane, at least within the center portion of the zone since this provides the optimum RF radiation signal.

Size of the fringe zone is primarily a function of the width of the two convergent beams, which in turn is a function of the width of the laser beam. Thus, zone size for a given laser can be changed, for example, by such means as positioning a divergent or convergent optical means, e.g., a lens, in the path of the laser beam prior to splitting it into the two coherent light beams or in the path of each of the equally split beams. The former is generally less cumbersome than the latter and is, therefore, preferred.

The invention can be practiced with an article bearing a single element, two substantially parallel elements, or a plurality of elements wherein the elements are substantially equally spaced and, preferably, also of equal width, and any two adjacent elements are substantially parallel to each other.

Case I

In the case of a single element, lateral distance and direction measurement by the method of the invention is primarily useful as a highly accurate means for determining a specific point or position on the article requiring a spatially precise production step, such as positioning of a microcircuit part, an aperture, a spot weld, or the like. The single element on the article can be a reference line or a functional element. In operation, the fringe zone diameter (D) is adjusted to be wider than the distance between the element and the spatial distance of lateral displacement to be established; relative lateral movement between the article and fringe zone is set in motion with continuous monitoring and comparison of the phase of the radiation RF signal and the constant RF reference until the degree of phase shift indicates the precise lateral displacement required. At this point, with the use of appropriate associated conventional electronics, relative lateral shifting is stopped and the article is appropriately marked.

It should be noted that in order to obtain the required RF signal of the scattered or transmitted radiation in the course of relative lateral movement, the fringe zone diameter D must be wider than the distance between the element and the lateral spatial point to be determined so that the element can be scanned throughout the course of lateral relative displacement of the zone and/or article until the desired laterally-displaced positioning point is reached. Relative phase measurement is determined by continuously comparing the phases of the constant RF reference and the phase of the radiation RF signal obtained from the detector. The phase difference between the signals provides information for determining in terms of $\lambda_s$ the distance from a given position to another position. Assuming that at the start the RF reference is adjusted electronically to bring it into exact phase with the starting radiation RF signal, as relative lateral shifting continues, relative phase shift occurs through the distance $\lambda_s$ until it achieves unity at $\lambda_s$, namely, completes a full phase cycle with the phase signals again in registry. Any comparative phase shift which is a fraction of a complete phase cycle can be translated into an accurate lateral displacement of the article by electronically computing the proportion of shift to $\lambda_s$.

Case II

In the case of an article bearing two parallel elements, it may be desired to determine a fractional distance between the two. In operation, the diameter of the fringe zone is adjusted to be larger than the distance d between the two elements, and the fringe period $\lambda_s$ or $n\lambda_s$ (wherein n equals an integer) is adjusted to equal d. The latter dimensioning of $d = \lambda_s$ or $n\lambda_s$ is essential so that the radiation RF signals produced in the detector by each of the elements at any given instant in time add up in the same phase relative to each other and, thereby, make possible the phase shift comparison with the reference RF phase, as aforedescribed, with maximum signal to noise ratio. Although it is not essential for the two elements to be present within the fringe zone simultaneously, so long as at least one is present, zone diameter and the number of fringes are preferably adjusted so that the two elements are within the zone throughout relative phase determination since the periodically adjusted elements will then augment the RF radiation signal and improve clarity of resolution. Any fractional distance between the two elements can be sensed by determining the relationship of the phase shift at a particular fractional distance to $\lambda_s$ as aforedescribed.

Case III

In the case of an article which bears a plurality of successively arranged elements as, for example, the reticle array on a linear scale, e.g., microscope micrometer, or linear encoder scales, or on a circular scale wherein preferably the reticles are adjacent the outer periphery, e.g., disc encoders, it may be desired to determine the distance (or lateral displacement) from an initial reticle position to a final reticle position, including, if necessary, a fractional distance between the final and the next succeeding element of the reticle, or it may merely be desired to determine the fractional distance between the final reticle and the next succeeding reticle. The former type of measurement will generally be preferred, particularly where total measurement is done electronically, since the entire operation can be accomplished in a single continuous process by the method of the invention. This approach is particularly useful with disc encoders, since it can eliminate the present state-of-the-art need for interiorly positioned tracks that provide the more significant bits for digital output. It can also diminish the increasingly expensive requirement for maximizing outer disc reticle density to increase magnitude resolution.

For purposes of the invention, the plural array of elements should be periodic, namely, equidistant and the fringe period should be adjusted to be equal to the distance d between the adjacent elements. Alternatively, d can equal $n\lambda_s$, but the former relationship is preferable. Since $\lambda_s$ must be substantially wider than the width ($w$ or $w - n\lambda_s$) of the individual elements, which should be of substantially equal width, it follows that d must be substantially larger than $w$ or $w - n\lambda_s$. The fringe zone diameter D can be adjusted to include two elements as described in Case II or to include a plurality of elements, the number, in practice, being determined by such factors as zone size limitations of the particular apparatus, degree of light intensity diminishment with increasing zone size, and the like.

Each element shold be substantially parallel to the next adjacent element so that, when laterally displaced into the center portion of the fringe zone (which has the greatest illumination intensity and, therefore, provides the strongest signals), they are substantially parallel to the fringe planes. Parallelism, of course, is not problem with a linear array or scale. However, in the case of a circular-disc reticle array, as in a disc encoder, adjacent scale elements are positioned along radii of the disc and are tilted relative to each other to a degree determined by their density and the length of the radius or of the disc. In a disc of relatively large radius and relatively high reticle density, adjacent elements are substantially parallel. Since lateral displacement of the elements of the disc is produced by rotation of the disc, tilting of adjacent elements relative to the fringe planes is greatest as they first advance into the outer periphery of the fringe zone and becomes progressively less as they enter the central portion of the zone where they become substantially parallel to the fringe planes, a condition which is adequate to provide the desired RF signal for phase comparison purposes.

In operation, the linear or circular article is continuously advanced through the fringe zone with continuous and simultaneous RF phase detection and comparison between radiation RF phase and the phase of the constant $\Delta f$ reference. Successive complete phase cycles, each of which, as aforedescribed, represents a linear shift of a dimension equal to $\lambda_s$ and, therefore, a unit phase shift, are electronically recorded to provide total displacement information from a starting to a final element. Since the phase shifts provide both total magnitude and directional information, the need for complex, multi-track encoder systems is eliminated. If the final position of the article lies between two adjacent elements, the fractional distance or displacement can be determined from the degree of phase shift with respect to $\lambda_s$. Maximum rate of relative fringe zone-article displacement generally depends on the particular band width of the conventional associated electronics.

The higher the rate of displacement the wider the electronic band width that is required. The band width can be designed in conventional manner to accommodate any given application.

The invention provides still another important advantage in the case of circular scales, such as disc encoders. Circular scales, which must be rotated in the course of performing their measuring function, are generally mounted on a central rotating shaft, which may be subject to wobble or slight off-centering with resulting eccentricity in the peripheral measuring scale during rotation. Additionally, the disc scale itself may not be perfectly circular. Cyclic error of first and higher orders introduced in these ways can result in significant measurement deviation if not compensated for. Detection of cyclic error and compensation therefor has hitherto required such methods as positioning of two, four, eight, or more separate optical devices, each associated with electronics, at spaced intervals around the encoder. In addition to being expensive and cumbersome, these methods are subject to error caused by deviations in the separate optical systems and the need for very accurate spacing and positioning with respect to the disc reticles. The method of the invention can obviate the need for such separate optical systems to determine and compensate for cyclic error by the simple expedient of splitting the fringe-forming beams into two or more sets of moving fringe-forming beams and thereby forming moving fringe-pattern zones at appropriate peripheral positions, e.g., at diagonally opposite locations, on the disc. By positioning the beam splitter(s) and any optics, such as mirrors, required to deflect the split beams into the desired spatial angle relative to the disc, in such manner that the angle of convergence of any beam pairs remains unaltered, two or more fringe zones having the same characteristics are produced from a single known laser source. The radiation RF signals obtained from each zone can, by use of appropriate conventional averaging electronics, be used to determine and compensate for most cyclic errors.

Optimum conditions for phase shift resolution, though not essential to the invention, can be obtained in the following ways:

1. In all cases: reducing ration of element width to fringe period $\lambda_s$. Preferably the ratio of $w/\lambda_s$ is one-half or less. In the case of $w-n\lambda_s$, the preferred ratio $(w-n\lambda_s)/\lambda_s$ is about one-half. The $w/\lambda_s$ ratio is generally preferred.

2. For the case of two or more parallel elements in a linear array:
$\lambda_s = d < D$ 3. For the case of circular array of elements:
$\lambda_s = d < D << r$ (radius)

The constant reference RF signal can be produced in any conventionally known manner. Preferably the constant RF reference signal is obtained from the same power oscillator that serves to drive the Bragg cell. This RF reference signal may be brought through a phase shifter that allows zeroing any phase difference at start of measurement if desired.

In the case of opaque, line-bearing articles, the scattered radiation is reflected and the optical system for gathering the scattered light is set up, in conventional manner, to pick up back-scatter. In the case of line-bearing transparent articles and slits, the radiation is transmitted and should be collected downstream of the fringe zone. It should also be noted that, in the case of transparent articles, lines at different levels within and/or on opposite sides of the article can be sensed.

Although it is generally preferred to shift the article relative to the fringe zone, it is also possible, if desired, to shift the fringe zone laterally relative to the electronics, by means such as appropriately moved mirrors.

The components of the apparatus for carrying out the method of the invention, including the optics and associated electronics, are conventional state-of-the-art and will be more fully described below.

DETAILED DESCRIPTION

Figures 1, 1A:
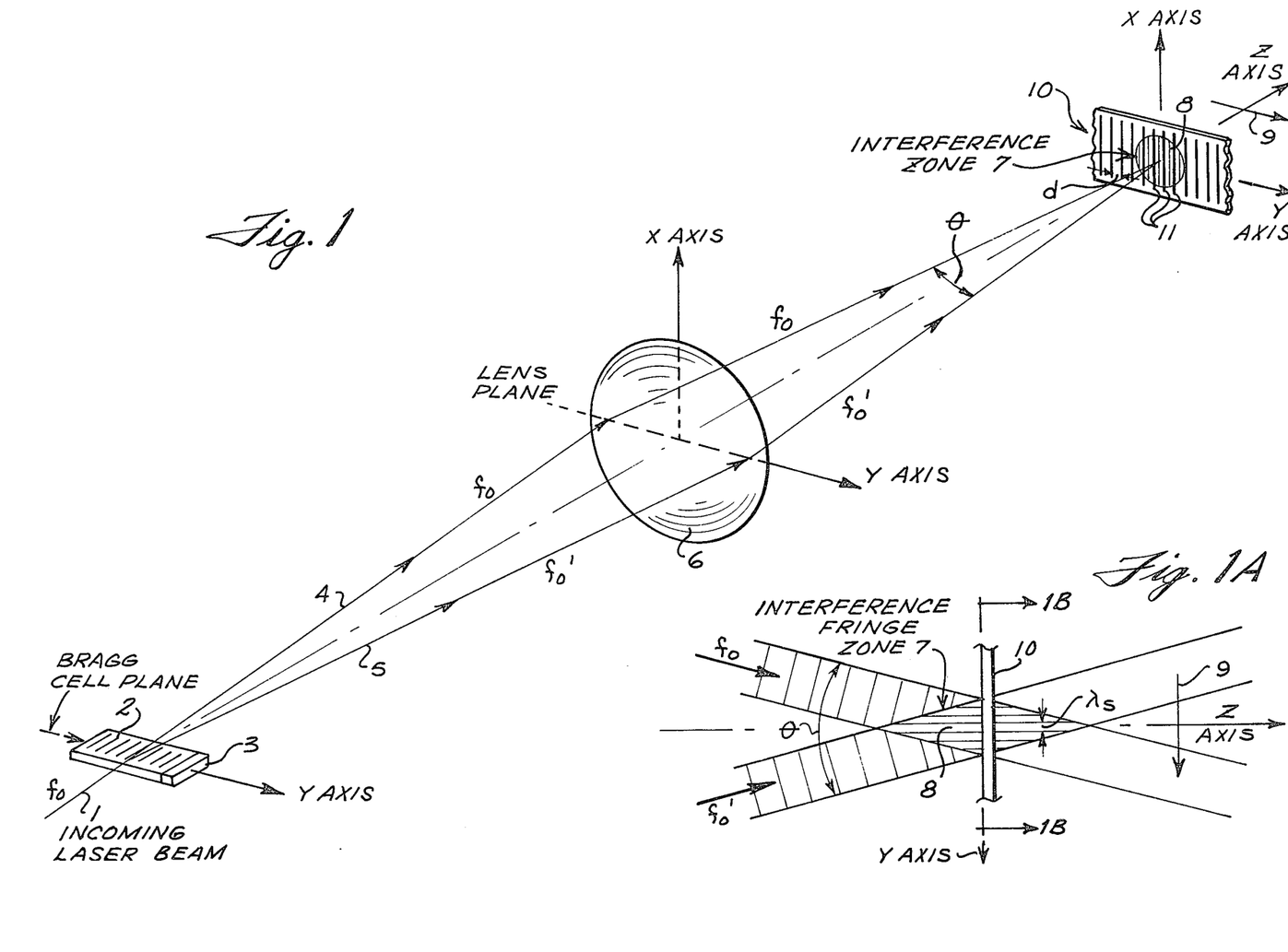
FIG. 1 is a diagrammatic illustation showing an embodiment of an optical system for implementing the lateral displacement measurement system of the invention and the coherent light beam paths and relationships.
FIG. 1A is an enlarged diagrammatic illustration showing the cross-over of the converging beams and resulting moving interference fringe pattern zone shown in FIG. 1.

In FIG. 1, laser beam 1 of frequency $f_0$ enters at a slight angle, diffraction Bragg cell 2 which is filled with a transparent medium, such as water, and compressionally driven by crystal transducer 3 at an imposed oscillation frequency, e.g., 10 to 50 Mc, to form acoustic wavelengths $\lambda_s$ in the cell medium. The input laser beam is divided by the Bragg cell into two coherent light beams of equal intensity, one beam 4 being non-diffracted and having the original $f_0$ frequency, and the other beam 5 being diffracted and acoustically modified into slightly shifted frequency $f_0'$. The difference in frequency $\Delta f$ is within the radio frequency range. The diverging beams leaving the cell are passed through appropriately designed convex lens 6, which converges the beams at cross-over zone 7 at an angle of convergence $\theta$. Within the zone of convergence a pattern of alternating dark and light interference fringes 8, shown out of proportion in FIG. 1, is more clearly defined in FIG. 1A. The fringes move in the direction shown by arrow 9 at a rate equal to Δf. FIGS. 1 and 1A shown the relative positions of the x, y, and z axes. It will be seen in FIG. 1A that the y and z axes lie in the plane of the paper and the x axis is perpendicular to the paper. The bisector of the two diverging-converging $f_0$ and $f_0{'}$ beams produced by the Bragg cell lie along the z axis; the normal to the fringe planes (y axis) is perpendicular to the converging beam bisector (z axis), the fringe planes are in the x-z plane; and the fringes move in the y direction. Article 10 bearing line or slit elements 11 is positioned in the x-y plane and held, by means shiftable along the y-axis not shown, within the fringe zone.

Figure 4:
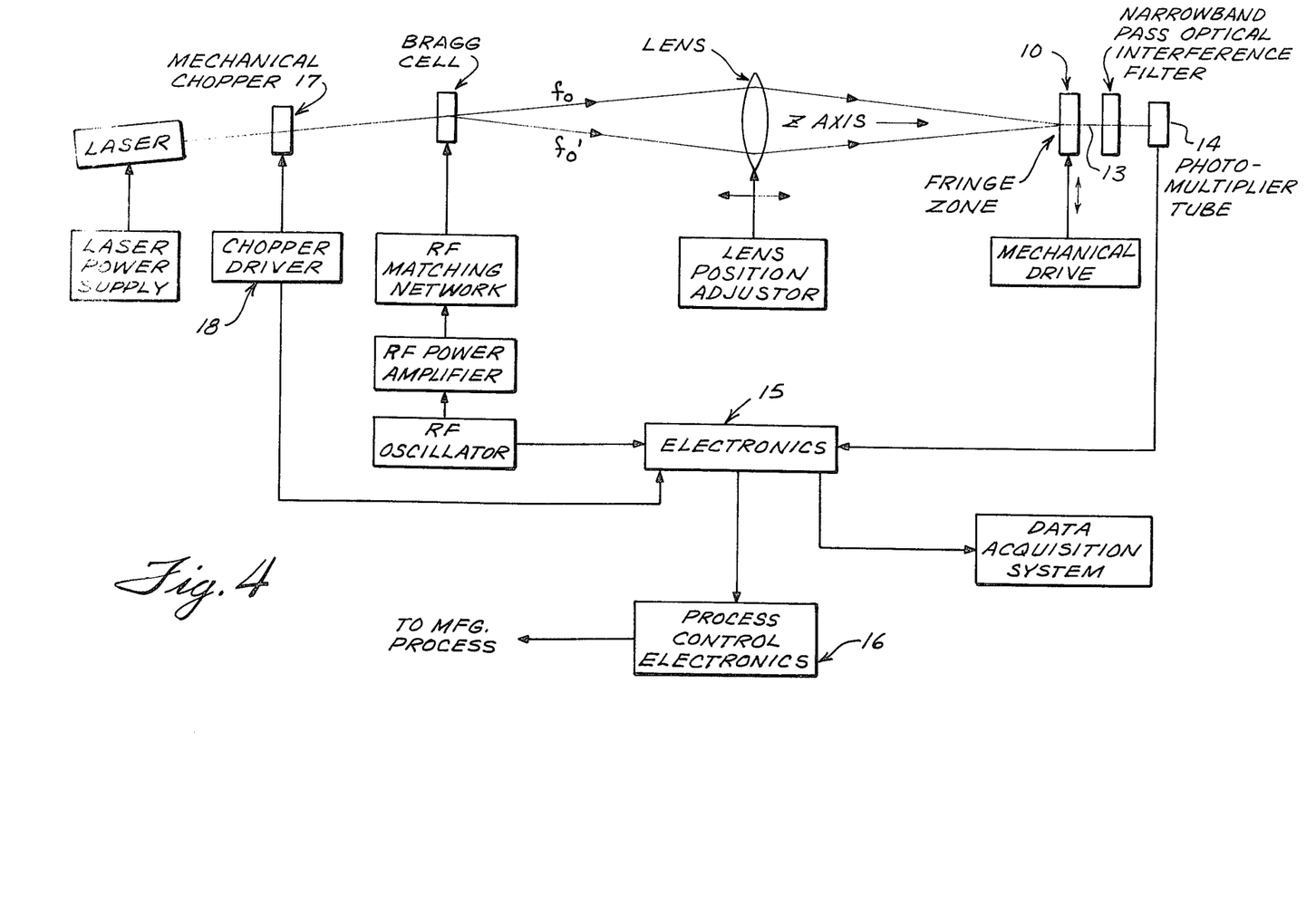
FIG. 4 is a schematic illustration of an embodiment with associated systems components employing "on-axis" transmitted radiation detection for use with slit elements or transparent line-bearing articles.
Figure 5:
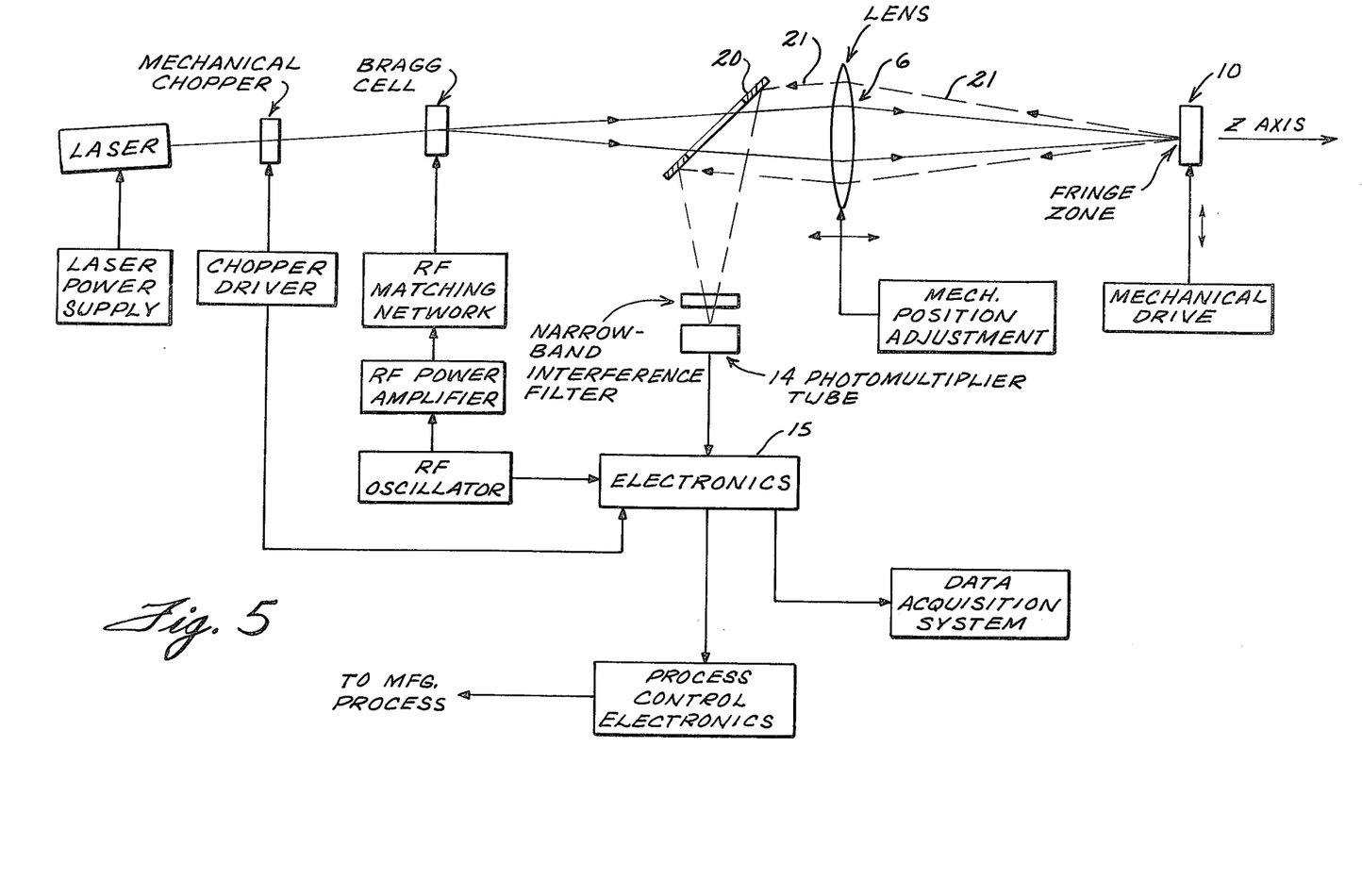
FIG. 5 is a schematic illustration of a modified system employing "on-axis" back-scatter detection for use with opaque line-bearing articles.

The fringe spacing or period $\lambda_s$ is determined by the equation:

$$\lambda_s = \frac{\lambda}{2 \sin(\theta/2)}$$

where λ is the wavelength of the incident laser beam. It is obvious, therefore, that the size of the fringe period $\lambda_s$ can be varied by varying either or both λ and θ. In general, it is easier to vary $\lambda_s$ by adjusting the convergent beam angle θ, as, for example, by shifting the position of the converging lens in the system shown in FIGS. 4 and 5.

Figure 1B:
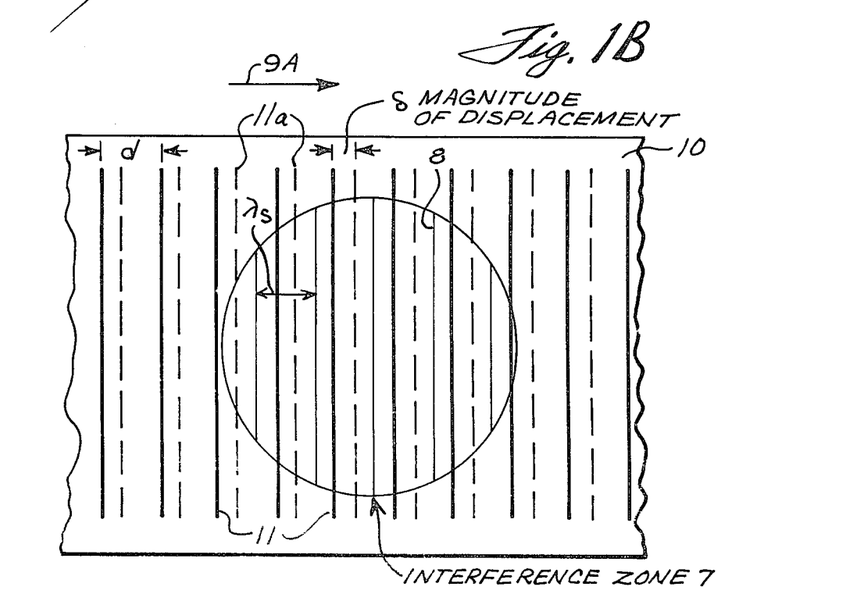
FIG. 1B shows a cross-section of FIG. 1A and the effect of lateral displacement of the article.

FIG. 1B shows, in cross-sectional expanded view, the relationship of line or slit elements 11 on article 10 to the fringe planes, both in initial and laterally displaced position. In this case, the x and y axes lie in the plane of the paper and the z axis is perpendicular to the plane. All of the elements, as schematically shown, are narrower than fringe period $\lambda_s$, parallel each to the other and to the fringe plane, and spaced apart a distance d equal to $\lambda_s$. After displacement of article 10 relative to fringe zone 7 in the direction of the arrow 9A, the elements 11 are laterally displaced a distance δ as shown by dotted elements 11a. By means of associated collecting optics and electronics, as shown in greater detail in FIGS. 4 and 5, the radiation scattered or transmitted by elements 11 are separated into its RF and DC components, the radiation RF signal thus obtained is then passed to an electronic phase sensitive detector and compared with the RF reference phase, as shown in FIGS. 4, 5, and 6.

Figure 2A:
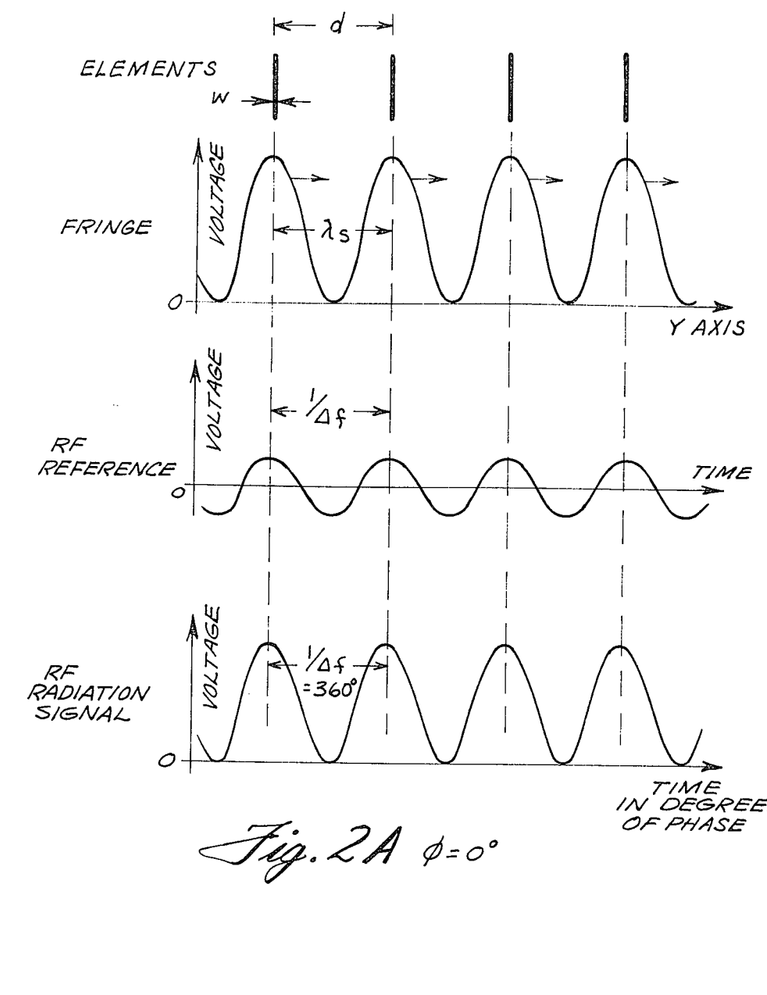
FIGS. 2A and 2B are diagrammatic illustrations showing in 2A an initial relationship of periodic elements, the y-axis spatial distribution of instantaneous fringe field intensity, the phase of the RF reference and the phase of the scattered or transmitted radiation RF signal. 2B illustrates the fringe and phase shift relationships resulting from lateral displacement of the elements through a distance $\delta$.
Figure 2B:
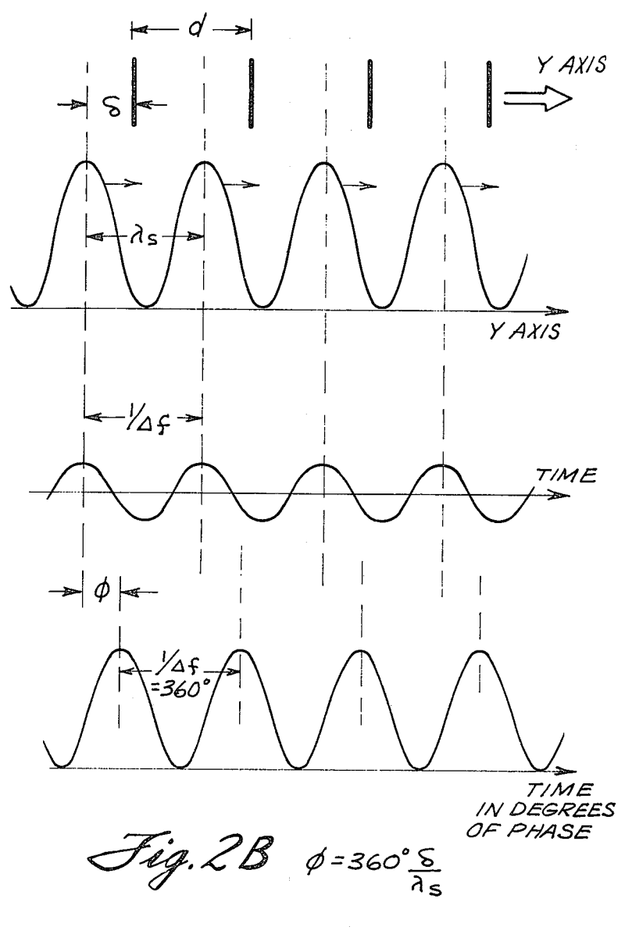

FIGS. 2A and 2B illustrate diagrammatically the relationship of a series of parallel, equidistant elements; the spatial distribution of the fringe field intensity at an instantaneous point in time, the base line indicating minimum or zero light intensity; the phase of the RF reference of frequency Δf; and the phase of the RF signal obtained by the electronic detector circuitry from the radiation scattered or transmitted by the elements. FIG. 2A illustrates an initial position wherein the radiation signal is exactly in phase with the reference signal and φ equals zero. φ is a dimensionless time quantity used to indicate a point in time with respect to a complete $\lambda_s$ period or phase cycle. At full cycle φ = 360°. At intermediate points $\phi = 360°\delta/\lambda_s$. FIG. 2B illustrates the effect of moving the parallel elements laterally, in the direction shown by the arrow, through a linear displacement distance δ. It will be noted that the fringe and RF reference curve remain the same and the RF radiation phase signal has shifted relative to the RF reference phase in the same direction as the traverse of the elements through a partial cycle $\delta = 360°\delta/\lambda_s$. Continued lateral movement of the elements through the distance $\lambda_s$ completes the phase shift through a full cycle and brings both RF signals into exact phase again. It is, of course, not essential that the RF radiation signal and RF reference be in exact phase registry initially, as shown in FIG. 2A, since appropriate electronics can be employed to adjust for any initial difference in phase position.

Figure 3:
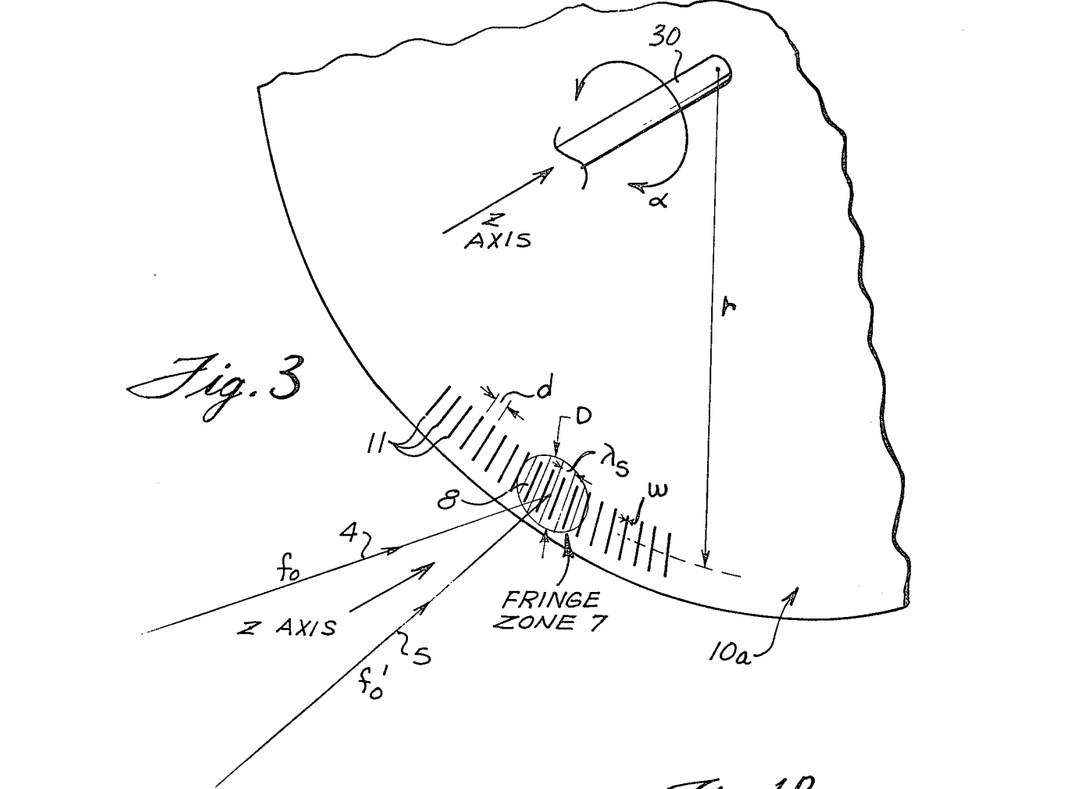
FIG. 3 is a fragmentary plan view showing another embodiment of the invention employing a circular scale or encoder.

FIG. 3 illustrates diagrammatically the substitution of a rotatable disc scale or disc encoder 10a of radius r, taken to the longitudinal center of the elements, provided with central shaft 30 oriented along the z-axis through angles of rotation indicated by α. It should be noted that with the relatively small ratio of D/r and the relatively close spacing of the elements 11, the adjacent elements, at least within the central portion of the fringe zone 7, are substantially parallel each to the other and to the fringe plane.

Figure 6:
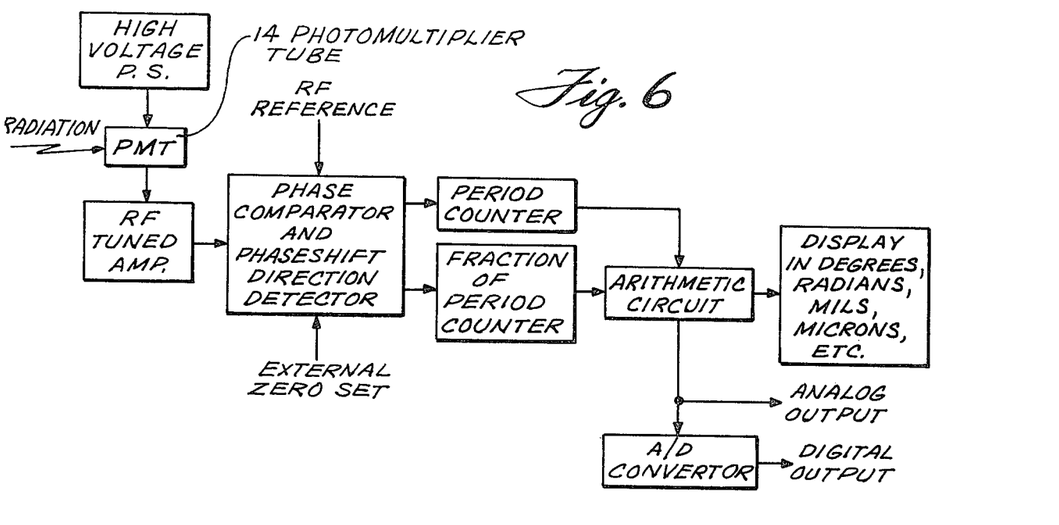
FIG. 6 is a schematic illustration of components which can be used for the "electronics" system of FIGS. 4 or 5.

FIG. 4 illustrates an embodiment such as previously described with associated devices for obtaining and utilizing the desired signals. All of the associated optical and electronic components shown in this and succeeding Figures are within the state of the art and, therefore, do not require detailed description. This embodiment is designed to collect "on-axis" transmitted radiation produced by slit elements or transparent line-bearing articles. The radiation 13 transmitted by article 10 is passed into photomultiplier 14. From there the signal passes into an electronics system 15, an illustrative type of which is shown in FIG. 6. The electronics system separates the signal to obtain its RF component, amplifies, rectifies, and filters it, and then passes it and the RF reference into an appropriate phase comparator and phase shift direction detector system which then passes the output to appropriate period counter and arithmetic circuits, from which the output goes to a data acquisition system, which can be employed to produce visual displays or recordings, or relays it into a closed loop process control electronics system 16 which feeds back to controls in a manufacturing process. Chopper 17 may optionally be inserted between the laser and Bragg cell and a reference signal at the chopping frequency, from chopper driver 18, can be fed into the electronics to allow synchronous detection of the signals. In addition, a reference with frequency equal to the RF frequency of the Bragg cell may be used to provide the RF reference for phase comparison.

FIG. 5 shows a system generally similar to that of FIG. 4 except that it uses lens 6 and annular mirror 20 to collect the radiation 21 back-scattered by article line elements and to focus it onto photomultiplier 14.

FIG. 6 shows schematically an electronics system 15 in detail which is adequately defined by the legends.

Figure 7:
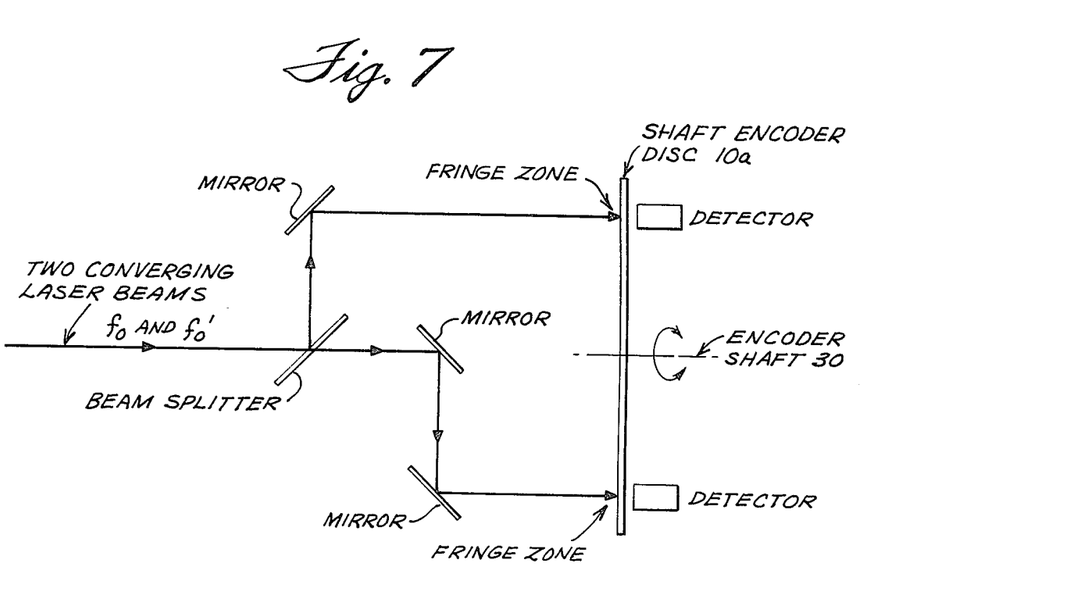
FIG. 7 is an illustration in fragmentary view showing still another embodiment of the invention wherein the fringe-forming beams are split to form two fringe zones.

FIG. 7 shows diagrammatically a system for dividing the fringe-zone-forming $f_0$ and $f_0{'}$ beams into two sets of equal intensity beams by means of an appropriate beam splitter and deflecting mirrors to form two fringe zones of equal size and fringe period, and spaced 180° apart on diagonally opposite sides of a disc encoder in a manner such that opposite elements pass through the two fringe zones. With the aid of associated conventional signal averaging electronics, not shown, the radiation RF signals from the two zones can be employed to determine and compensate for cyclic error. Multiples of the two zones, e.g., 4, 8, etc., can be produced with the use of additional appropriately positioned beam splitters and mirrors.

It will be understood that different optical and electronics means known to the art can be employed to practice the invention.

Although this invention has been described with reference to illustrative embodiments thereof, it will be apparent to those skilled in the art that the principles of this invention can be embodied in other forms but within the scope of the claims.

We claim:

1. A process for sensing the magnitude and direction of lateral displacement of at least one line or slit element of an article comprising:
   1. producing two coherent light beams of the same intensity, one of said beams having a different frequency from said other beam, the frequency difference $\Delta f$ being within the radio frequency range;
   2. converging said beams to form an interference zone comprising a fringe pattern within the zone of convergence, said fringe pattern continuously moving laterally at a rate equal to $\Delta f$;
   3. adjusting the fringe period $\lambda_s$ of the pattern to a width which is substantially wider than the width $w$ of said element or the positive difference between the width of the element and an integer multiple of the fringe period $n\lambda_s$;
   4. positioning at least the portion of said article bearing said element within the interference zone in such manner that said article lies in a plane defined by the $x$-axis normal to the plane of the convergent beams and the $y$-axis normal to the fringe planes, and said element is in a position, relative to said article, such that the longitudinal axis of said element is substantially parallel to a fringe plane;
   5. laterally shifting the fringe zone and/or the article positioned within said fringe zone along the $y$-axis in such a manner as to produce relative lateral displacement between them while maintaining said element substantially parallel to the fringe plane at least at the central portion of the fringe zone;
   6. continuously determining the phase of the RF signal component of the radiation scattered or transmitted by said element as said relative lateral displacement between said zone and article continues from a first position to a second position of said element within the fringe zone;
   7. simultaneously continuously comparing the phase of the scattered or transmitted radiation RF signal with the phase of a constant RF reference having a frequency equal to $\Delta f$; and
   8. sensing the magnitude and direction of phase shift between said radiation RF signal and said RF reference between first and second positions, whereby said magnitude indicates the extent of lateral displacement of the element between said first and second position and said direction indicates the direction of relative lateral displacement.

2. The process of claim 1 wherein said element is a single element and said second position is a desired spatial position on said article.

3. The process of claim 1 wherein said at least one element comprises two substantially parallel elements; the fringe period $\lambda_s$ or its integer multiple $n\lambda_s$ is additionally adjusted to be substantially equal to the distance $d$ between the elements; and the diameter D of the fringe zone is adjusted to be wider than $d$.

4. The process of claim 3 wherein said two elements respectively represent said first and second positions.

5. The process of claim 1 wherein said at least one element comprises a plurality of substantially equidistant elements; each of said plurality of elements is substantially parallel to the next adjacent element; the fringe period $\lambda_s$ or its integer multiple $n\lambda_s$ is additionally adjusted to be substantially equal to the distance $d$ between the elements; and the diameter D of the fringe zone is adjusted to be wider than $d$.

6. The process of claim 5 wherein the distance between said first and second positions includes an integer multiple of $d$.

7. The process of claim 5 wherein said elements comprise a linear array of substantially parallel elements.

8. The process of claim 6 wherein said elements comprise a linear array of substantially parallel elements.

9. The process of claim 5 wherein said elements comprise a circular array of elements positioned adjacent the outer periphery of a circular article.

10. The process of claim 6 wherein said elements comprise a circular array of elements positioned adjacent the outer periphery of a circular article.

11. The process of claim 9 wherein the article is a disc encoder.

12. The process of claim 10 wherein the article is a disc encoder.

13. The process of claim 9 wherein the two beams of different frequency are each equally divided to form at least two sets of two beams having the same frequency characteristics as the parent beams; said at least two sets of beams are oriented to converge and form at least two moving fringe patterns at predetermined spatially-separated positions with respect to said circular array of elements.

14. The process of claim 10 wherein the two beams of different frequency are each equally divided to form at least two sets of two beams having the same frequency characteristics as the parent beams; said at least two sets of beams are oriented to converge and form at least two moving fringe patterns at predetermined spatially-separated positions with respect to said circular array of elements.

15. The process of claim 11 wherein the two beams of different frequency are each equally divided to form at least two sets of two beams having the same frequency characteristics as the parent beams; said at least two sets of beams are oriented to converge and form at least two moving fringe patterns at predetermined spatially-separated positions with respect to said circular array of elements.

16. The process of claim 12 wherein the two beams of different frequency are each equally divided to form at least two sets of two beams having the same frequency characteristics as the parent beams; said at least two sets of beams are oriented to converge and form at least two moving fringe patterns at predetermined spatially-separated positions with respect to said circular array of elements.

17. The process of claim 1 wherein the fringe period is at least twice as wide as the element.

18. The process of claim 2 wherein the fringe period is at least twice as wide as the element.

19. The process of claim 3 wherein the fringe period is at least twice as wide as the element.

20. The process of claim 4 wherein the fringe period is at least twice as wide as the element.

21. The process of claim 5 wherein the fringe period is at least twice as wide as the element.

22. The process of claim 6 wherein the fringe period is at least twice as wide as the element.

23. The process of claim 7 wherein the fringe period is at least twice as wide as the element.

24. The process of claim 8 wherein the fringe period is at least twice as wide as the element.

25. The process of claim 9 wherein the fringe period is at least twice as wide as the element.

26. The process of claim 10 wherein the fringe period is at least twice as wide as the element.

27. The process of claim 11 wherein the fringe period is at least twice as wide as the element.

28. The process of claim 12 wherein the fringe period is at least twice as wide as the element.

29. The process of claim 13 wherein the fringe period is at least twice as wide as the element.

30. The process of claim 14 wherein the fringe period is at least twice as wide as the element.

31. The process of claim 15 wherein the fringe period is at least twice as wide as the element.

32. The process of claim 16 wherein the fringe period is at least twice as wide as the element.

33. The process of claim 3 wherein $d$ equals $\lambda_s$.

34. The process of claim 4 wherein $d$ equals $\lambda_s$.

35. The process of claim 5 wherein $d$ equals $\lambda_s$.

36. The process of claim 6 wherein $d$ equals $\lambda_s$.

37. The process of claim 7 wherein $d$ equals $\lambda_s$.

38. The process of claim 8 wherein $d$ equals $\lambda_s$.

39. The process of claim 9 wherein $d$ equals $\lambda_s$.

40. The process of claim 10 wherein $d$ equals $\lambda_s$.

41. The process of claim 11 wherein $d$ equals $\lambda_s$.

42. The process of claim 12 wherein $d$ equals $\lambda_s$.

43. The process of claim 13 wherein $d$ equals $\lambda_s$.

44. The process of claim 14 wherein $d$ equals $\lambda_s$.

45. The process of claim 15 wherein $d$ equals $\lambda_s$.

46. The process of claim 16 wherein $d$ equals $\lambda_s$.

47. The process of claim 19 wherein $d$ equals $\lambda_s$.

48. The process of claim 20 wherein $d$ equals $\lambda_s$.

49. The process of claim 21 wherein $d$ equals $\lambda_s$.

50. The process of claim 22 wherein $d$ equals $\lambda_s$.

51. The process of claim 23 wherein $d$ equals $\lambda_s$.

52. The process of claim 24 wherein $d$ equals $\lambda_s$.

53. The process of claim 25 wherein $d$ equals $\lambda_s$.

54. The process of claim 26 wherein $d$ equals $\lambda_s$.

55. The process of claim 27 wherein $d$ equals $\lambda_s$.

56. The process of claim 28 wherein $d$ equals $\lambda_s$.

57. The process of claim 29 wherein $d$ equals $\lambda_s$.

58. The process of claim 30 wherein $d$ equals $\lambda_s$.

59. The process of claim 31 wherein $d$ equals $\lambda_s$.

60. The process of claim 32 wherein $d$ equals $\lambda_s$.

61. Apparatus for sensing the magnitude and direction of displacement of at least one line or slit element on an article, comprising:
1. means for producing two convergent coherent light beams of the same intensity, one of said beams having a different frequency from said other beam, the frequency difference $\Delta f$ being within the radio frequency range;
2. means for positioning at least the portion of said article bearing said element within the interference fringe zone produced by the convergence of said two beams, said interference fringe zone comprising a laterally moving fringe pattern having a predetermined fringe period, said article being positioned in such manner that it lies in a plane defined by the axis normal to the plane of the convergent beams and the axis normal to the fringe planes, and said element is in a position, relative to said article such that the longitudinal axis of said element is substantially parallel to the fringe plane;
3. adjustment means capable of setting said predetermined fringe period at a size substantially wider than said element or the positive difference between the width of the element and a whole integer multiple of the fringe period;
4. means for shifting said fringe zone and/or said article positioned within said fringe zone relative to each other along the y-axis;
5. means for separating the RF signal component from the radiation scattered by said line element or transmitted by said slit element;
6. means for producing a constant RF reference having a frequency $\Delta f$;
7. means for continuously detecting and comparing the phase of the radiation RF signal and the phase of the RF reference.

62. The apparatus of claim 61 wherein the shifting means comprises means for shifting the article.

63. The apparatus of claim 61 wherein the means for producing the RF reference is the means for producing the two light beams of different frequency, the frequency difference $\Delta f$ being in the radio frequency range.

64. The apparatus of claim 62 wherein the means for producing the RF reference is the means for producing the two light beams of different frequency, the frequency difference $\Delta f$ being in the radio frequency range.

65. The apparatus of claim 61 which includes means for computing the extent of phase shift between the radiation RF phase and the RF reference phase.

66. The apparatus of claim 62 which includes means for computing the extent of phase shift between the radiation RF phase and the RF reference phase.

67. The apparatus of claim 63 which includes means for computing the extent of phase shift between the radiation RF phase and the RF reference phase.

68. The apparatus of claim 64 which includes means for computing the extent of phase shift between the radiation RF phase and the RF reference phase.

69. The apparatus of claim 65 which includes means for transmitting the phase shift information to a data acquisition system capable of producing a display or recording.

70. The apparatus of claim 65 which includes means for transmitting the phase shift information to controls in a manufacturing process.

* * * * *